United States Patent [19]

Kaul et al.

[11] Patent Number: 5,698,683
[45] Date of Patent: Dec. 16, 1997

[54] MIXED ALUMINIUM-HEAVY METAL DYESTUFF COMPLEXES AND A PROCESS FOR THEIR PREPARATION

[75] Inventors: Bansi Lal Kaul, Biel-Benken, Switzerland; Dominique Pflieger, Tagsdorf, France

[73] Assignee: Clariant Finance (BVI) Limited, Tortola, Bulgaria

[21] Appl. No.: 439,734

[22] Filed: May 12, 1995

Related U.S. Application Data

[63] Continuation-in-part of Ser. No. 155,979, Nov. 19, 1993, abandoned.

[51] Int. Cl.$^6$ .......................... C09B 45/22; C09B 45/00; C09B 45/01; C09B 45/12
[52] U.S. Cl. .......................... 534/692; 534/693; 534/700; 534/712; 534/713; 534/715
[58] Field of Search .......................... 534/692, 715, 534/700, 712, 713, 693

[56] References Cited

U.S. PATENT DOCUMENTS

| | | | |
|---|---|---|---|
| 1,885,641 | 11/1932 | Straub et al. | 534/722 |
| 1,895,559 | 1/1933 | Straub et al. | 534/711 |
| 2,090,432 | 8/1937 | Straub et al. | 534/722 |
| 2,120,799 | 6/1938 | Crossley et al. | 534/712 |
| 2,230,686 | 2/1941 | Holzach et al. | 534/700 |
| 2,352,701 | 7/1944 | Fischer et al. | 534/709 |
| 2,565,898 | 8/1951 | Widmer et al. | 534/700 X |
| 2,814,614 | 11/1957 | Zickendraht | 534/700 X |

FOREIGN PATENT DOCUMENTS

| | | | |
|---|---|---|---|
| 0861677 | 2/1941 | France | 534/700 |
| 0637404 | 5/1950 | United Kingdom | 534/700 |
| 2259305 | 3/1993 | United Kingdom | 534/700 |
| 2272702 | 5/1994 | United Kingdom | 534/700 |

*Primary Examiner*—Floyd D. Higel
*Attorney, Agent, or Firm*—Gabriel Lopez; Carol A. Loeschorn

[57] ABSTRACT

A process for preparing a mixed aluminium-heavy metal dyestuff complex, in which the amount of heavy metal present is 10–98% and that of aluminium is 2 to 90% comprising i) reacting the metal free dyestuff with less than a stoichiometric amount of a heavy metal compound followed by ii) reacting the product with an aluminium compound in an amount to produce a stoichiometric excess of metal (calculated on all the metal present) to form a mixed aluminium-heavy metal complex.

29 Claims, No Drawings

MIXED ALUMINIUM-HEAVY METAL DYESTUFF COMPLEXES AND A PROCESS FOR THEIR PREPARATION

This application is a continuation-in-part of U.S. Ser. No. 08/155,979, filed Nov. 19, 1993, now abandoned.

When preparing heavy metal-dyestuff complexes, in order to ensure that complete metallisation has occurred and that no unreacted dyestuff remains (and so to avoid a worse final product), a stoichiometric excess of metal is always added. Usually the stoichiometric excess is in the order of 10–15%. This excess is however disadvantageous from the ecological point of view, since it produces 10–15% heavy metal salt which remains in the filtrate, after filtering the metal-dyestuff complexes. This filtrate therefore requires expensive processing before it is ecologically acceptable and can be safely discharged.

Further, problems arise with the heavy metal-dyestuff complexes themselves due to the toxicity of the metal that causes treatment, to make it ecologically safe, difficult. However, due to their effectiveness, particularly the chromium-, nickel-, cobalt- and copper-dyestuff complexes belong to the most important metal-dyestuff complexes available and people are not willing to do without them.

For purposes of the present invention, the term "heavy metal" excludes aluminium.

In order to reduce the amount of toxic residues in waste waters resulting from heavy metal-dyestuff complexes, it has been found that mixed aluminium/heavy metal-dyestuff complexes are as effective as the heavy metal-dyestuff complexes without the toxicological drawbacks associated with the heavy metal-dyestuff complexes and by careful regulation of the preparation of these complexes, excess heavy metal salt can almost totally be eliminated.

To this end therefore, there is provided a process for preparing a mixed aluminium-heavy metal dyestuff complex in which the mount of heavy metal present is 10–98% and that of aluminium is 2 to 90%, characterized by i) reacting the metal free dyestuff with less than a stoichiometric amount of a heavy metal compound followed by ii) reacting the product with an aluminium compound in an amount to produce a stoichiometric excess of metal (calculated on all the metal present) to form a mixed aluminium-heavy metal complex.

It should be clear that the stoichiometric amount of metal compound necessary to form one mole of a 1:1 dye:metal complex is double the stoichiometric amount of metal compound required to form one mole of a 2:1 dye:metal complex.

The heavy metal of such complexes are preferably those that contain cobalt, copper, chromium and nickel.

Preferred chromium compounds used as a reactant in a process according to the invention are alkali dichromates.

Preferred cobalt compounds used as a reactant in a process according to the invention are cobalt salts such as cobalt chlorides and sulphates, especially $CoSO_4 \cdot 7H_2O$, nitrates and acetates.

Preferred nickel and copper compounds used as a reactant in a process according to the invention are nickel and copper salts especially the halides, sulphates or the acetates.

Preferably the amount of heavy metal compound used in a process according to the invention for a 1:1 complex is 10 to 98 mole % per mole of dyestuff and in 2:1 complexes 10 to 98 mole % per 2 moles of dyestuff.

Preferably the amount of aluminium used in a process according to the invention is 10 to 120 mole % of aluminium compound (with respect to the dyestuff). Preferably the aluminium compound used is aluminium sulphate.

Where chroming is carried out using alkali dichromate, a reducing compound such as sugar (e.g. glucose), is to be added.

Further according to the invention there is provided a mixed aluminium-heavy metal complex in which the dyestuff is selected from any metal complex forming dyestuff, for example water soluble dyestuffs, solvent soluble dyestuffs and insoluble dyestuffs (i.e. pigments).

Preferred dyestuffs for use as a reactant in a process according to the invention are solvent soluble (i.e. water insoluble) dyestuffs.

Preferred complexes according to the invention are 2:1 azo- mixed aluminium-heavy metal-complex dyes.

The properties of the complexes according to the invention compared to their aluminium-free counterparts are almost the same except in several cases for the nuances, which due to the aluminium content tend to be lightly hypsochrome.

Preferred complexes according to the invention are those of formula I and I'

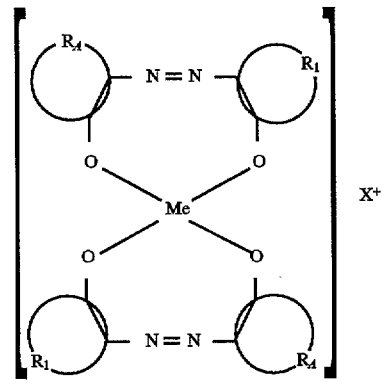

(I)

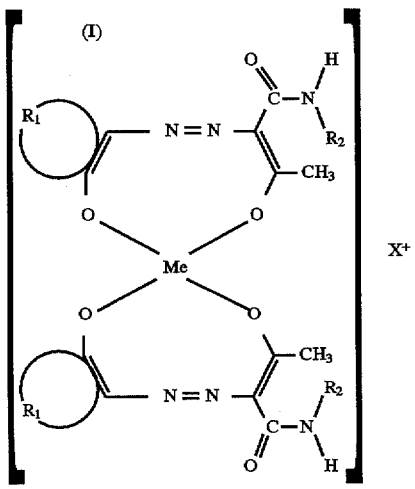

(I')

in which each group $R_1$ together with the two carbon atoms independently, to which $R_1$ is attached form a single ring or fused ring aromatic group, which is unsubstituted or further substituted by one to three groups selected from hydroxy, $C_{1-4}$alkyl, $C_{1-4}$alkoxy, cyano, nitro, rhodan, $C_{1-4}$alkylcarbonyl, benzoyl, $C_{1-3}$alkylcarbonyloxy, aminocarbonyl, mono$C_{1-4}$ alkylaminocarbonyl, di-($C_{1-4}$alkyl)aminocarbonyl, mono($C_{1-4}$alkoxy-$C_{2-4}$alkyl)aminocarbonyl, di-($C_{1-4}$alkoxy-$C_{2-4}$alkyl)aminocarbonyl, $C_{1-3}$alkoxycarbonyl, aminosulphonyl, mono$C_{1-4}$alkylaminosulphonyl, di($C_{1-4}$alkyl)aminosulphonyl, mono ($C_{1-4}$alkoxy-$C_{2-4}$alkyl)aminosulphonyl, di($C_{2-4}$alkoxy-$C_{2-4}$alkyl)amino-sulphonyl and 4,6-bis-(2',4'-dimethylphenyl)triazinyl-2;

both groups $R_2$, independently are selected from $C_{3-20}$alkyl, $C_{1-4}$alkoxy-$C_{2-8}$alkyl and phenyl, which phenyl is unsubstituted or further substituted by one to three groups selected from hydroxy, $C_{1-4}$alkyl, $C_{1-4}$alkoxy, cyano, nitro, rhodan, $C_{1-4}$alkylcarbonyl, benzoyl, $C_{1-3}$alkylcarbonyloxy, aminocarbonyl, mono$C_{1-4}$alkylaminocarbonyl, di($C_{1-4}$alkyl)aminocarbonyl, mono($C_{1-4}$alkoxy-$C_{2-4}$alkyl)aminocarbonyl, di($C_{1-4}$alkoxy-$C_{2-4}$alkyl)aminocarbonyl, $C_{1-3}$alkoxycarbonyl, aminosulphonyl, mono$C_{1-4}$alkylaminosulphonyl, di($C_{1-4}$alkyl)aminosulphonyl, mono($C_{1-4}$alkoxy-$C_{2-4}$alkyl)amino-sulphonyl and di($C_{1-4}$alkoxy-$C_{2-4}$alkyl)aminosulphonyl;

each group $R_A$ together with the two carbon atoms independently to which $R_A$ is attached form a phenyl or naphthyl radical which is unsubstituted or further substituted by one or two groups independently selected from hydrogen, $C_{1-4}$alkyl, $C_{1-4}$alkoxy, cyano, nitro, $C_{1-4}$alkoxycarbonyl, benzoyl, phenoxycarbonyl, aminocarbonyl, mono$C_{1-4}$alkylaminocarbonyl, di($C_{1-4}$alkyl)aminocarbonyl, mono ($C_{1-4}$alkoxy-$C_{2-4}$alkyl) aminocarbonyl, di($C_{1-4}$alkoxy-$C_{2-4}$alkyl) aminocarbonyl, phenylaminocarbonyl, aminosulphonyl, mono $C_{1-4}$alkylaminosulphonyl, di($C_{1-4}$alkyl) aminosulphonyl, mono($C_{1-4}$alkoxy-$C_{1-4}$alkyl) aminosulphonyl, di($C_{1-4}$alkoxy-$C_{2-4}$alkyl) aminosulphonyl and phenylaminosulphonyl;

Me is 10 to 98 mole % of a metal selected from chromium, copper, cobalt and nickel and 20 to 90 mole % aluminium; and $X^+$ is a cation.

Preferably $R_1$ is $R_1'$ where $R_1'$ together with the two carbon atoms to which k is attached forms a phenyl ring or a naphthyl ring as well as a heterocyclic aromatic ring, such as a five membered ring containing an oxygen, a sulphur and/or a nitrogen atom, (especially pyrazolone or pyridone).

Preferably in this Specification, any $C_{1-4}$alkyl is preferably methyl or ethyl; any $C_{1-4}$alkoxy is preferably methoxy or ethoxy and preferably halogen is chlorine or bromine.

In the complexes of formula I, $R_1$ together with the two carbon atoms to which it is attached form a phenyl or 1-phenyl-3-methylpyrazolyl coupling component, in which the phenyl ring (of the phenyl or 1-phenyl-3-methylpyrazolyl coupling component) is unsubstituted or substituted by 1 or 2 substituents selected from chloro, bromo,methyl, ethyl, methoxy, ethoxy, carbonamide and sulphonamide.

In the complexes of formula I', $R_1$ together with the two carbon atoms to which it is attached form a naphthyl or a phenyl ring, which naphthyl or phenyl ring is unsubstituted or substituted by 1 or 2 substituents selected from chloro, bromo,methyl, ethyl, methoxy, ethoxy, carbonamide and sulphonamide.

Preferably $X^+$ is $X^{1+}$ where $X^{1+}$ is selected from alkali metal ions, especially sodium, potassium, ammonium, monoalkylammonium, dialkylammonium, trialkylammonium, 4-amino-2,2,6,6-tetramethylpiperidinyl, 4-hydroxy-2,2,6,6-tetramethylpipetidinyl and 4-keto-2,2,6,6-tetramethylpiperidinyl ions. (Preferably the alkyl groups are $C_{1-12}$alkyl).

Preferred complexes of formula I and I' are selected from those of the formula Ia, Ib and Ic

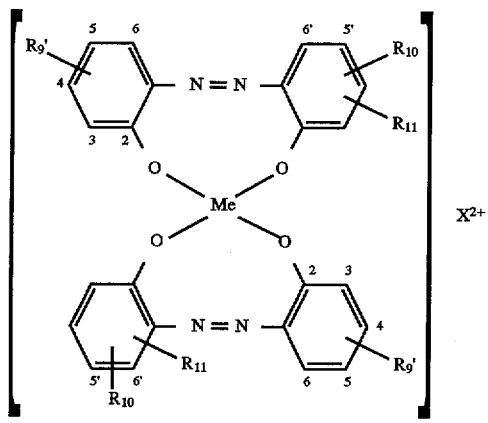

(Ia)

-continued

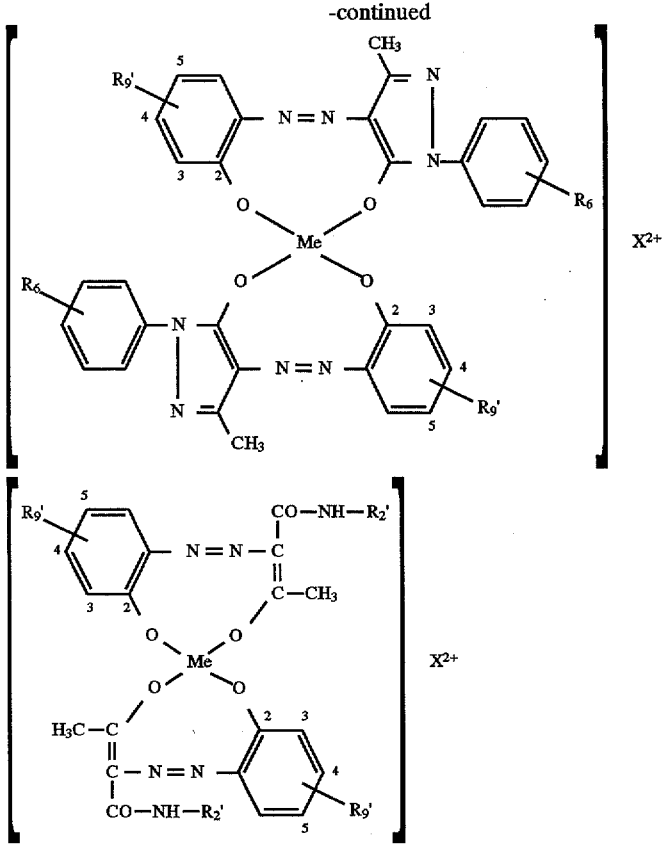

(Ib)

(Ic)

in which each $R_3'$ independently is selected from nitro or —$SO_3NHR_7$ where $R_7$ is selected from hydrogen, $C_{1-2}$alkyl, $C_{1-2}$alkoxy-$C_{2-3}$alkyl and phenyl; more preferably $R_7$ is $R_7'$ where $R_7'$ is methyl, ethyl, $C_{1-2}$alkoxy$C_{2-3}$alkyl or phenyl;

each $R_6$ is hydrogen, halogen, $C_{1-2}$alkyl or $C_{1-2}$alkoxy; more preferably $R_6$ is $R_6'$ where $R_6'$ is selected from hydrogen, chloro and methyl, especially hydrogen;

each $R_2'$ is 2-ethylhexyl or phenyl, unsubstituted or substituted by one to three substituents selected from chloro, bromo and methyl or one to two substituents selected from chloro, bromo and methyl, ethyl, $C_{1-4}$alkoxy and acetyl;

Me is 25 to 95 mole % Cr or Co and 5 to 75 mole % Al;

$X^{2+}$ is selected from sodium, potassium, ammonium, $C_{1-10}$alkylammonium, 4-amino-2,2,6,6-tetramethylpiperidinyl, 4-hydroxy-2,2,6,6-tetramethylpiperidinyl and 4-keto-2,2,6,6-tetramethylpiperidinyl ions and each $R_{10}$ and each $R_{11}$ independently are selected from hydrogen, halogen, hydroxy, $C_{1-4}$alkyl, $C_{1-4}$alkoxy, acetyl, benzoyl and 4,6-bis-(2',4'-dimethylphenyl) triazinyl-2; or $R_{10}$ and $R_{11}$ in a particular phenyl ring together with the phenyl ring to which they are attached form a naphthyl group, preferably attached in the 5' and 6' position and whereby the substituents $R_3'$ are in the 4- or 5-position.

Preferably the metallisation of the metal-free dyestuffs can be carried out in alkali-aqueous medium, preferably at temperatures of 40°–100° C. more preferably at temperatures between 70°–95° C. The pH values generally lie between 10 and 12. Advantageously, a solvent, such as a glycol or glycol ether can be added to the aqueous medium.

For chroming, for example dichromate is added to a well mixed suspension of the dyestuff and about twice the amount of a reducing agent, the mixture is mixed for three hours and then, always at temperatures up to 100° C., the aluminium salt, dissolved in water, is added.

The other salts (i.e. copper, nickel or cobalt containing salts can be treated in a similar fashion, without the need to add a reducing agent.

After salting out and washing the dissolved salt, the metal complex mixture can be isolated by known methods.

The mixed metal dyestuff complexes according to the invention can be used for the same uses as for the pure heavy metal dyestuff complexes of the prior art. The metal complex dyestuff mixtures according to the invention that are free of water solubilizing groups are useful for dyeing (including dyeing in the mass) of plastics masses, including solvent free and solvent containing plastics masses or plastics resins. For example the metal complex dyestuff mixtures according to the invention can be applied in finishes having an oil or aqueous base, in various lacquers, in spin dyeing of viscose or cellulose acetate, for dyeing of natural and synthetic polyamide, polyester, polyolefins (such as polyethylene), polystyrene, polyvinylchloride, rubber and artificial leather. The metal complex dyestuff mixtures according to the invention can be used for printing of graphic material, for dyeing of paper masses, for coating of textile and leather or for printing uses.

Dyeings made from metal complex dyestuff mixtures according to the invention show excellent fastness to the effects of heat, have good lightfastness and good weatherability, have good fastness to chemicals have good migration properties, good blooming properties, good overcoating finish properties, good solvent fastness properties, good dyeing strength and good application properties (e.g. good flocculation fastness etc).

Dyeing and printing can be carried out on the abovementioned materials by known methods.

For the avoidance of doubt, the term "mixed aluminium-heavy metal complexes" includes both i) mixtures of an aluminium complex and a heavy metal complex, represented by Formula A, below (for complexes of Formula Ia), and ii) single complexes containing both heavy metal and aluminium, represented by Formula B, below (for complexes of Formula 1a).

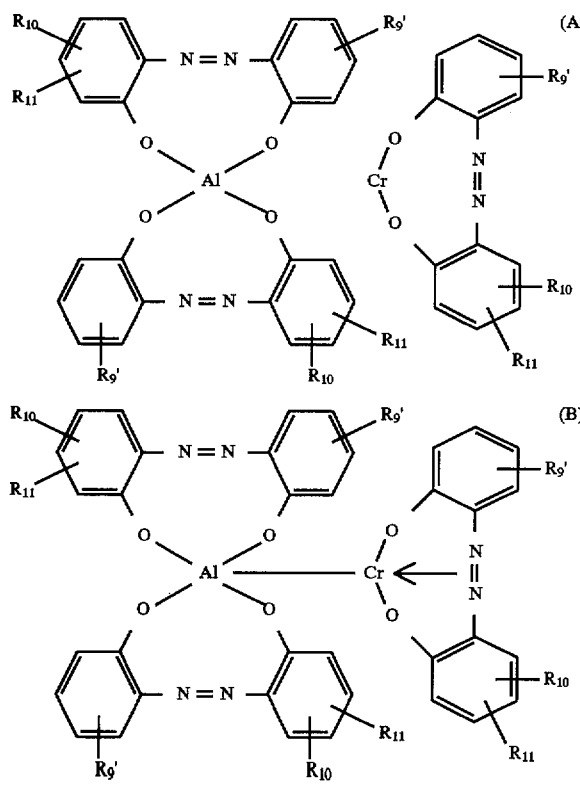

The invention will now be illustrated by the following Examples.

In the following Examples all parts are by weight and all percentages are by weight, unless indicated to the contrary. All temperatures are in ° C. 1 part by volume equates to 1 part by volume of water.

EXAMPLE 1 a) 51.3 parts of 1-amino-2-hydroxy-4-nitrobenzene are stirred into a solution of 250 parts water and 92.5 parts of 30% HCl. 100 parts of ice are then added and then the amine is diazotised with 83 parts by volume of a 4N NaNO$_2$ solution. Buffering is carried out using sodium acetate to bring the mixture to a pH of 4.5. A solution of 56 parts of 1-phenyl-3-methylpyrazolone-5 in 400 parts of water and 48 parts of 30% NaOH solution is then introduced slowly. By the simultaneous addition of 39 parts of 30% HCl the pH value is maintained at 4.5 during coupling. The resultant suspension is stirred for 8 hours at room temperature and then stirred for half an hour at 80° C. The precipitate is then filtered, washed in 1500 parts of hot water and then dried.

b) 36.6 parts of the monoazo dyestuff of part a) above is suspended in 120 parts of water, 20 parts by volume of diethyleneglycol monomethylether and 33 parts of 30% NaOH. This is warmed to 70° C. and stirred for 30 minutes. The pH of the suspension is about 11.9.

c) After heating to 95° C., a Solution of 7.8 parts of cobalt sulphate (CoSO$_4$.7H$_2$O) in 50 parts of water is added over 30 minutes. After stirring for two hours at 95° C., a solution of 1 part aluminium sulphate in 2 parts of water is slowly added.

After stirring for 2 hours at 95° C., the dyestuff is filtered hot washed with 1% NaCl solution until the filtrate is colorless and neutral and then is washed with about 300 parts of cold water to remove soluble inorganic salt.

The resultant dyestuff is of formula a

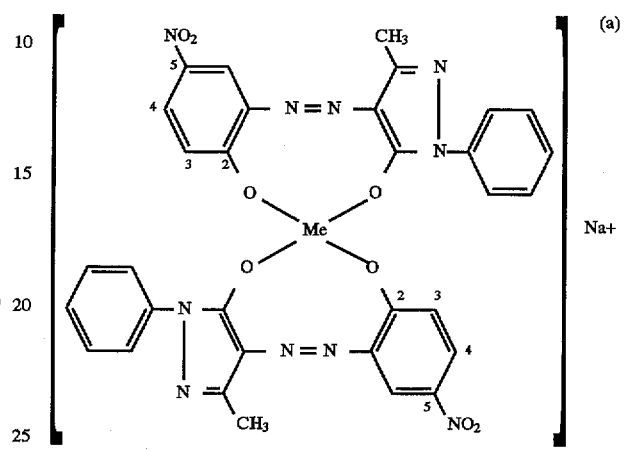

in which Me is 98% cobalt and 2% aluminium.

EXAMPLE 2

The method of Example 1 parts a and b is repeated followed by:

c) After warming to 95° C. a solution of 7.8 parts of sodium dichromate and 16.3 parts of glucose in 50 parts of water is added over 30 minutes. This is stirred for 2 hours at 95° C. and 1 part of aluminium sulphate dissolved in 2 parts of water is added. The mixture is stirred for a further hour and a complex mixture of formula a in which Me is 98% chromium and 2% aluminium results.

EXAMPLE 3–9

By a method analogous to that of Example 1 or 2, compounds of the formula 1a

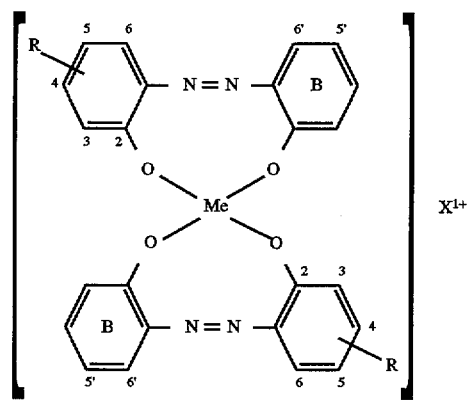

in which the symbols are defined in Table 1 below can be prepared from appropriate reactants.

TABLE 1

| Ex. No. | R | Ring B | Me | $X^{1+}$ | Nuance on dyeings |
|---|---|---|---|---|---|
| 3 | 4-/5-nitro (mixed 1:1) | 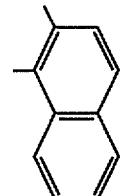 | 92% Co, 8% Al | Dicyclohexyl-ammonium | black |
| 4 | " | " | 92% Cr, 8% Al | Dicyclohexyl-ammonium | " |
| 5 | 5-$SO_2NH(CH_2)_3OCH_3$ | " | 87% Co, 13% Al | sodium | violet |
| 6 | " | " | 87% Cr, 13% Al | " | " |
| 7. | " | " | 50% Co, 50% Al | " | red |
| 8. | " | " | 50% Co, 50% Al | 4-amino-2,2,6,6-tetramethyl-piperidinium | red |
| 9 | 4-/5-nitro | " | 70% Cr, 30% Al | 25% 2-ethyl-hexylammonium 75% dicyclohexyl-ammonium | black |

EXAMPLES 7–23

By a method analogous to that of Example 1 or 2, compounds of the formula

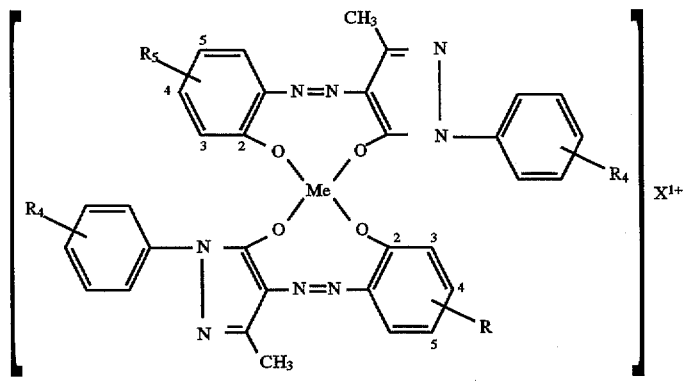

in which the symbols are defined in Table 2 below can be prepared from appropriate reactants.

TABLE 2

| Ex. No. | R | $R_4$ | Me | $X^+$ | | Nuance of the dyeing |
|---|---|---|---|---|---|---|
| 10 | 4-nitro | H | 95% Co, 5% Al | | (H₅C₂)₂N— [xanthene dye structure with —COOH and ⁺N(C₂H₅)₂] | red |
| 11 | " | H | 95% Cr, 5% Al | " | | " |

TABLE 2-continued

| Ex. No. | R | R₄ | Me | X⁺ | Nuance of the dyeing |
|---|---|---|---|---|---|
| 12 | 5-SO₂NHCH₃ | 3-Cl | 84% Co, 16% Al | 25% 2-ethylhexylammonium 75% dicyclohexylammonium | orange |
| 13 | " | " | 84% Cr, 16% Al | " | " |
| 14 | 4-SO₂NHCH₃ | " | 98% Co, 2% Al | potassium | scarlet |
| 15 | " | " | 98% Cr, 2% Al | " | " |
| 16 | 5-nitro | H | 98% Co, 2% Al | sodium | red |
| 17 | " | H | 98% Cr, 2% Al | " | " |
| 18 | 5-SO₂NHCH₃ | Cl | 25% Co, 75% Al | " | gold yellow |
| 19 | " | H | 25% Co, 75% Al | 4-amino-2,2,6,6-tetramethyl-piperidinium | " |
| 20 | 4-SO₂NHCH₃ | Cl | 40% Cr, 60% Al | 4-amino-2,2,6,6-tetramethyl-piperidinium | orange |
| 21 | 4-nitro | H | 30% Co, 70% Al | 4-keto-2,2,6,6-tetramethyl-piperidinium | gold yellow |
| 22 | 5-nitro | H | 70% Cr, 30% Al | sodium | orange |
| 23 | 5-SO₂NHCH₃ | Cl | 75% C7, 25% Al | " | " |
| 23A | 4-nitro | H | 95% Cr, 5% Al | 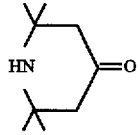 | orange |

EXAMPLES 24–28

In the Examples of Table 3 below, the Me content is 80% Cobalt and 20% Aluminium.

TABLE 3

| Ex. No. | Dyestuff mixture | Cation | Nuance on the dyeing |
|---|---|---|---|
| 24 | 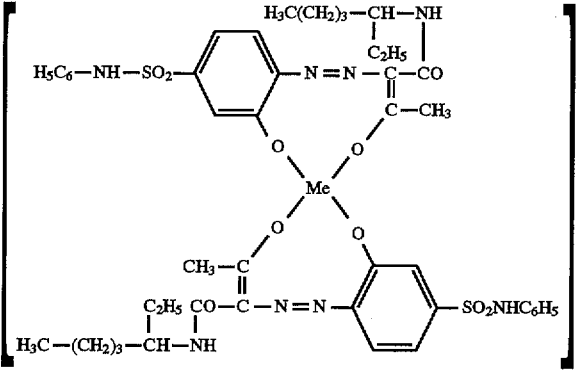 | 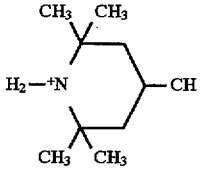 | yellow |
| 25. | 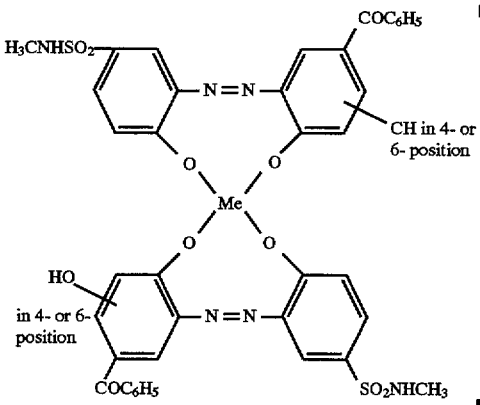 | 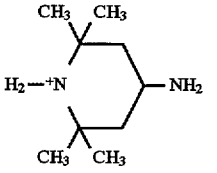 | red |

TABLE 3-continued

| Ex. No. | Dyestuff mixture | Cation | Nuance on the dyeing |
|---|---|---|---|
| 26 | (complex dyestuff structure: Me-coordinated bis-azo complex with H₅C₆NHSO₂, OCH₃, NH, CO-C(CH₃)=C-O-Me-O-C(CH₃)=C-CO-NH, OCH₃, SO₂NHCH₃ substituents) | 2,2,6,6-tetramethyl-4-oxopiperidinium (H₂—⁺N, CH₃ ×4, =O) | yellow |
| 27 | (Me-complex bis-azo: H₅C₆NHSO₂–Ar–N=N–Ar(COCH₃)(CH)–O–Me–O–Ar(COCH₃)(CH)–N=N–Ar–SO₂NHC₆H₅) | 2,2,6,6-tetramethyl-4-oxopiperidinium | red |
| 28 | (Me-complex bis-azo: H₃CNHSO₂–Ar–N=N–Ar(COC₆H₅)(CH in 4- or 6- position)–O–Me–O–Ar(COC₆H₅, HO in 4- or 6-position)–N=N–Ar–SO₂NH(CH₂)₃OCH₃; positions labeled 1,2,4,6) | 4-amino-2,2,6,6-tetramethylpiperidinium (H₂—⁺N, CH₃ ×4, NH₂) | red |

EXAMPLES 29–36

By a method analogous to that of Example 1 or 2, compounds of the formula

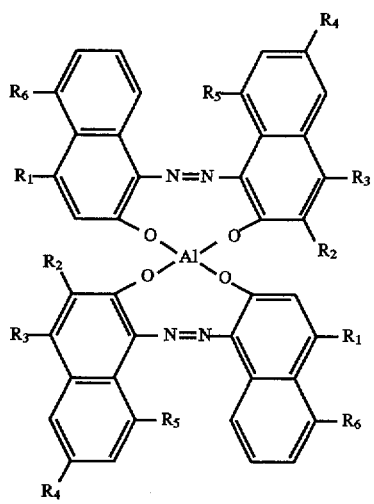

in which the symbols are defined in Table 4, below, can be prepared from appropriate reactants.

TABLE 4

| Ex. | $R_1$ | $R_2$ | $R_3$ | $R_4$ |
|---|---|---|---|---|
| 29 | —SO$_2$NHCH$_3$ | H | H | —SO$_2$NHCH$_3$ |
| 30 | —SO$_2$NH(CH$_2$)$_3$OCH$_3$ | H | H | —SO$_2$NH(CH$_2$)$_3$OCH$_3$ |
| 31 | —SO$_2$NHCH$_3$ | —SO$_2$NHCH$_3$ | H | —SO$_2$NHCH$_3$ |
| 32 | —SO$_2$NH(CH$_2$)$_3$OCH$_3$ | —SO$_2$NH(CH$_2$)$_3$OCH$_3$ | H | —SO$_2$NH(CH$_2$)$_3$OCH$_3$ |
| 33 | H | H | H | —SO$_2$NHCH$_3$ |
| 34 | H | H | H | —SO$_2$NH(CH$_2$)$_3$OCH$_3$ |
| 35 | —SO$_3$NHCH$_3$ | H | —SO$_2$NHCH$_3$ | —NO$_2$ |
| 36 | —SO$_2$(CH$_2$)$_3$OCH$_3$ | H | —SO$_2$NH(CH$_2$)$_3$OCH$_3$ | —NO$_2$ |

| Ex. | $R_5$ | $R_6$ | metal | nuance |
|---|---|---|---|---|
| 29 | H | H | 90% Cr, 5% Al | black |
| 30 | H | H | 95% Cr, 5% Al | " |
| 31 | H | H | 98% Cr, 2% Al | " |
| 32 | H | H | 90% Cr, 10% Al | " |
| 33 | —SO$_2$NHCH$_3$ | —SO$_2$NHCH$_3$ | 80% Co, 20% Al | " |
| 34 | —SO$_2$NH(CH$_2$)$_3$OCH$_3$ | —SO$_2$NH(CH$_2$)$_3$OCH$_3$ | 98% Co, 2% Al | " |
| 35 | H | H | 95% Co, 5% Al | " |
| 36 | H | H | 97% Co, 3% Al | " |

Application Example 5 parts of the dyestuff of Example 1 (formula a) in a Dissolver apparatus are stirred into 95 parts of a nitrocellulose lacquer prepared from:

---

18.8% of Nitrocellulose A15 (in the form of white flocs wetted with 35% isopropanol)
6.3% of an acrylic acid butyl ester polymer, a softener resin (Acronal 4F from BASF)
3.3% of diphenyloctylphosphate, a softener (Santiciser 141 from Monsanto)
10.0% of methoxy propanol (Dowanol PM from Dow Chemical)
10.0% ethoxypropanol
41.6% ethanol, and
10.0% ethyl acetate.

---

This is dissolved overnight in a rolling block. The solubility is very good.

With a 25 μm blade, a wet film of this lacquer composition is placed on aluminium foil and the lacquer is dried for 5 hours at 130° C. A orange-yellow lacquer coating results with good light and migration fastness properties.

The application example can be repeated using 5 parts of any one of the new dye complex of the invention of Examples 2–28 in place of that of Example 1.

What is claimed is:

1. A process for preparing a mixed aluminium-heavy metal dyestuff complex in which the heavy metal is present in an amount of 10–98 mole % and the aluminium is present in an amount of 2 to 90 mole %, said mole % based on 1 mole of said mixed aluminum-heavy metal dyestuff complex, wherein said process comprises i) reacting the metal free dyestuff with less than a stoichiometric amount of a heavy metal compound to form a mixture, said stoichiometric amount calculated based on the metal-free dyestuff or all the metal present in the complex, and ii) adding to said mixture an aluminium compound in an amount sufficient to produce a stoichiometric excess of metal (calculated on all the metal present in the dyestuff complex) to form the mixed aluminium-heavy metal complex.

2. A process according to claim 1 in which the heavy metal compound is selected from the group consisting of a cobalt compound, a copper compound, a chromium compound and nickel compound.

3. A process according to claim 2 in which a) the chromium compound is an alkali dichromate;

b) the cobalt compound is selected from a cobalt chloride and a cobalt sulphate;

c) the nickel and copper compounds are selected from nickel and copper halides, sulphates and acetates; and d) the aluminium compound is an aluminium sulphate.

4. A process according to claim 1 in which the amount of heavy metal compound for a 1:1 dye:metal complex is 10 to 98 mole % per mole of metal-free dyestuff and for a 2:1 dye:metal complex is 10 to 98 mole % per 2 moles of metal-free dyestuff.

5. A process according to claim 1 in which the mount of aluminium compound added to the mixture for a 1:1 dye:metal complex is 10 to 120 mole % per mole of metal-free dyestuff and for a 2:1 dye:metal complex is 10 to 120 mole % per two moles of metal-free dyestuff.

6. A process according to claim 1 in which in the metal-free dyestuff is selected from the group consisting of water-soluble dyestuffs, solvent-soluble dyestuffs and insoluble dyestuffs and pigments.

7. A process according to claim 6 in which the metal-free dyestuff is a solvent soluble, water-insoluble dyestuff.

8. A process according to claim 1 in which the complex is a 2:1 azo dye: mixed aluminium-heavy metal dyestuff complex.

9. A process according to claim 1 in which the complex is one of formula I and I'

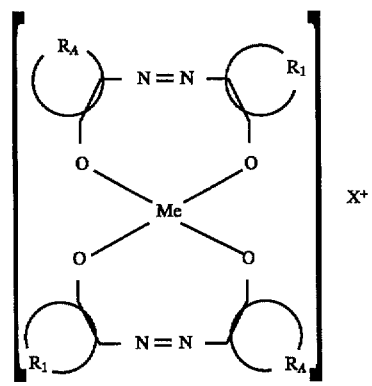

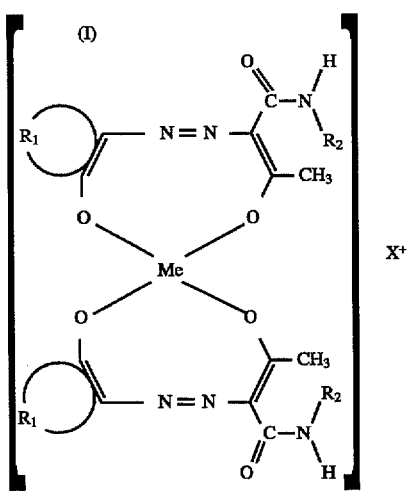

in which each group $R_1$, together with the two carbon atoms independently to which $R_1$ is attached, form a single ring or fused ring aromatic group, which is unsubstituted or further substituted by one to three groups selected from hydroxy, $C_{1-4}$alkyl, $C_{1-4}$alkoxy, cyano, nitro, rhodan, $C_{1-4}$alkylcarbonyl, benzoyl, $C_{1-3}$alkylcarbonyloxy, aminocarbonyl, monoC$_{1-4}$ alkylaminocarbonyl, di-($C_{1-4}$alkyl)aminocarbonyl, mono($C_{1-4}$alkoxy-$C_{2-4}$alkyl)aminocarbonyl, di-($C_{1-4}$ alkoxy-$C_{2-4}$alkyl)aminocarbonyl, $C_{1-3}$alkoxycarbonyl, aminosulphonyl, monoC$_{1-4}$alkylaminosulphonyl, di($C_{1-4}$alkyl)aminosulphonyl, mono($C_{1-4}$alkoxy-$C_{2-4}$ alkyl)aminosulphonyl, di($C_{1-4}$alkoxy-$C_{2-4}$alkyl) aminosulphonyl and 4,6-bis-(bis(2',4'-dimethylphenyl) triazinyl-2;

both groups $R_2$, independently are selected from $C_{3-20}$alkyl, $C_{1-4}$alkoxy-$C_{2-8}$alkyl and phenyl, which phenyl is unsubstituted or further substituted by one to three groups selected from hydroxy, $C_{1-4}$alkyl, $C_{1-4}$alkoxy, cyano, nitro, rhodan, $C_{1-4}$alkylcarbonyl, benzoyl, $C_{1-3}$alkylcarbonyloxy, aminocarbonyl, monoC$_{1-4}$alkylaminocarbonyl, di($C_{1-4}$alkyl) aminocarbonyl, mono($C_{1-4}$alkoxy-$C_{2-4}$alkyl) aminocarbonyl, di($C_{2-4}$alkoxy-$C_{2-4}$alkyl) aminocarbonyl, $C_{1-3}$alkoxycarbonyl, aminosulphonyl, monoC$_{1-4}$alkylaminosulphonyl, di($C_{1-4}$alkyl) aminosulphonyl, mono($C_{1-4}$alkoxy-$C_{2-4}$alkyl) aminosulphonyl and di($C_{2-4}$alkoxy-$C_{2-4}$alkyl) aminosulphonyl;

group $R_A$ together with the two carbon atoms independently to which $R_A$ is attached form a phenyl or naphthyl radical which is unsubstituted or further substituted by one or two groups independently selected from hydrogen, $C_{1-4}$alkyl, $C_{1-4}$alkoxy, cyano, nitro, $C_{1-4}$alkoxycarbonyl, benzoyl, phenoxycarbonyl, aminocarbonyl, monoC$_{1-4}$alkyl-aminocarbonyl, di($C_{1-4}$alkyl)aminocarbonyl, mono ($C_{1-4}$alkoxy-$C_{2-4}$ alkyl)aminocarbonyl, di($C_{1-4}$alkoxy-$C_{2-4}$alkyl) aminocarbonyl, phenylaminocarbonyl, aminosulphonyl, monoC$_{1-4}$alkylaminosulphonyl, di($C_{1-4}$alkyl)aminosulphonyl, mono($C_{1-4}$alkoxy-$C_{2-4}$ alkyl) amino- sulphonyl, di($C_{1-4}$alkoxy-$C_{2-4}$alkyl) aminosulphonyl and phenylaminosulphonyl;

Me is 10 to 98 mole % of a metal selected from chromium, copper, cobalt and nickel and 20 to 90 mole % aluminium; and $X^+$ is a cation.

10. A process according to claim 1 in which the complex is one of formula Ia, Ib or Ic

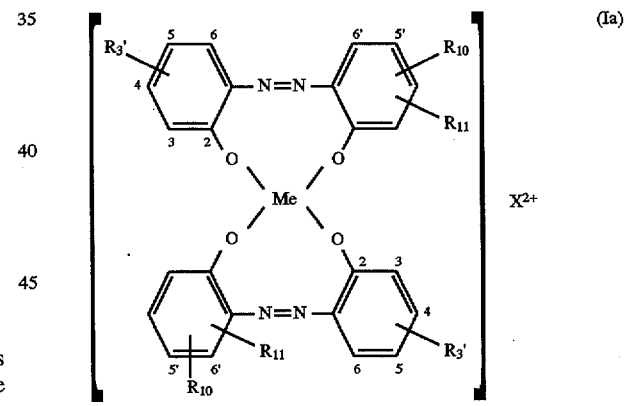

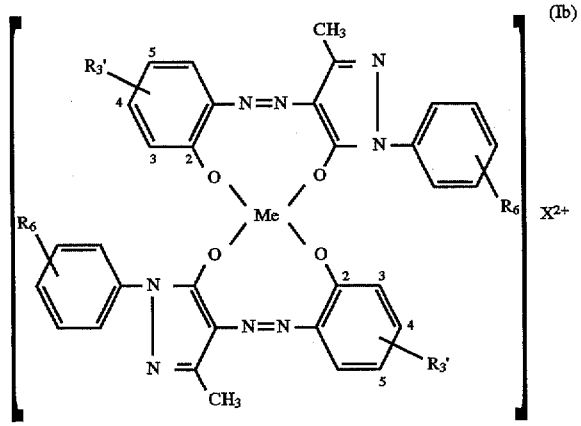

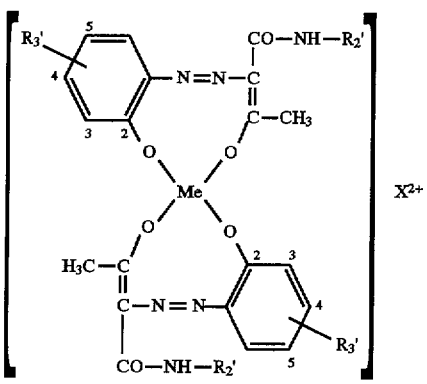

in which each $R_3'$ independently is selected from nitro or —$SO_3NHR_7$, where $R_7$ is selected from hydrogen, $C_{1-2}$alkyl, $C_{1-2}$alkoxy-$C_{2-3}$alkyl and phenyl;

each $R_6$ is hydrogen, halogen, $C_{1-2}$alkyl or $C_{1-2}$alkoxy;

each $R_2'$ is 2-ethylhexyl or phenyl, unsubstituted or substituted by one to three substituents selected from chloro, bromo and methyl or one to two substituents selected from chloro, bromo and methyl, ethyl, $C_{1-4}$alkoxy and acetyl;

Me is 25 to 95 mole % Cr or Co and 5 to 75 mole % Al;

$X^{2+}$ is selected from sodium, potassium, ammonium, $C_{1-10}$alkylammonium, 4-amino-2,2,6,6-tetramethylpiperidinyl, 4-hydroxy-2,2,6,6-tetramethylpiperidinyl and 4-keto-2,2,6,6-tetramethylpiperidinyl ions and each $R_{10}$ and each $R_{11}$ independently are selected from the group consisting of hydrogen, halogen, hydroxy, $C_{1-4}$alkyl, $C_{1-4}$alkoxy, acetyl, benzoyl and 4,6-bis(2', 4'-dimethylphenyl) triazinyl-2; or collectively, $R_{10}$ and $R_{11}$ together with the phenyl ring to which they are both attached form a naphthyl group, preferably attached in the 5' and 6' position, said naphthyl group being substituted in the 4- or 5-position with $R_3'$.

11. A process according to claim 2 wherein said heavy metal is chromium.

12. A process according to claim 11 wherein said complex comprises from 80 to 98 mole % of chromium and 2 to 20 mole % of aluminium.

13. A process according to claim 12 wherein an organic reducing compound is added to the mixture in i) prior to adding the aluminium compound.

14. A mixed aluminium-heavy metal dyestuff complex of the formulae I and I'

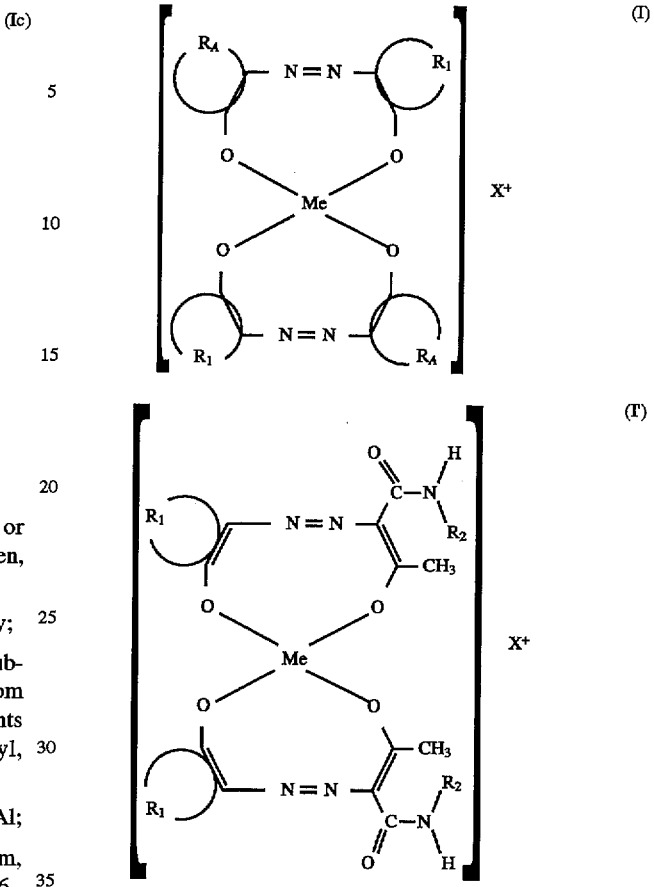

wherein each $R_1$ together with the two carbon atoms independently to which $R_1$ is attached form a single ring or fused ring aromatic group, which is unsubstituted or further substituted by one to three groups selected from the group consisting of hydroxy, $c_{1-4}$alkyl, $C_{1-4}$alkoxy, cyano, nitro, rhodan, $C_{1-4}$alkylcarbonyl, benzoyl, $C_{1-3}$alkylcarbonyloxy, aminocarbonyl, mono($C_{1-4}$alkyl) aminocarbonyl, di($C_{1-4}$alkyl)-aminocarbonyl, mono($C_{1-4}$alkoxy-$C_{2-4}$alkyl) aminocarbonyl, di($C_{1-4}$alkoxy-$C_{2-4}$alkyl)-aminocarbonyl, $C_{1-3}$alkoxycarbonyl, aminosulphonyl, mono($C_{1-4}$alkyl) aminosulphonyl, di($C_{1-4}$alkyl)aminosulphonyl, mono($C_{1-4}$alkoxy-$C_{2-4}$alkyl)-aminosulphonyl, di($C_{1-4}$alkoxy-$C_{2-4}$alkyl)aminosulphonyl, and 4,6-bis(2',4'-dimethylphenyl) triazinyl-2; both groups $R_2$ independently are selected from the group consisting of $C_{3-20}$alkyl, $C_{1-4}$ alkoxy-$C_{2-8}$alkyl and phenyl, which phenyl is unsubstituted or further substituted by one to three groups selected from the group consisting of hydroxy, $C_{1-4}$alkyl, $C_{1-4}$-alkoxy, cyano, nitro, rhodan, $C_{1-4}$alkylcarbonyl, benzoyl, $C_{1-3}$alkylcarbonyloxyl, aminocarbonyl, mono($C_{1-4}$alkyl)aminocarbonyl, di($C_{1-4}$alkyl)aminocarbonyl, mono- ($C_{1-4}$alkoxy-$C_{2-4}$alkyl) aminosulphonyl, di($C_{1-4}$alkoxy-$C_{2-4}$alkyl)aminosulphonyl, $C_{1-3}$alkoxycarbonyl, aminosulphonyl, mono($C_{1-4}$alkyl)-aminosulphonyl, di($C_{1-4}$alkyl)-aminosulphonyl, mono($C_{1-4}$alkoxy-$C_{2-4}$alkyl)aminosulphonyl, and di($C_{1-4}$alkoxy-$C_{2-4}$alkyl)-aminosulphonyl; group $R_A$ together with the two carbon atoms independently to which $R_A$ i attached form a phenyl or naphthyl radical which is unsubstituted or further substituted by one or two groups independently selected from the group consisting of hydrogen, $C_{1-4}$alkyl, $C_{1-4}$alkoxy, cyano, nitro, $C_{1-4}$alkoxycarbonyl, benzoyl, phenoxycarbonyl, aminocarbonyl, mono($C_{1-4}$alkyl)aminocarbonyl, di($C_{1-4}$alkyl)-aminocarbonyl, mono($C_{1-4}$alkoxy-$C_{2-4}$alkyl)-aminocarbonyl, di($C_{1-4}$alkoxy-$C_{2-4}$alkyl)-aminocarbonyl, phenylaminocarbonyl, aminosulphonyl, mono($C_{1-4}$alkyl)aminosulphonyl, di($C_{1-4}$alkyl)aminosulphonyl, mono($C_{1-4}$alkoxy-$C_{2-4}$alkyl)aminosulphonyl, di($C_{1-4}$alkoxy$C_{2-4}$alkyl)aminosulphonyl and phenylaminosulphonyl;

Me is 10 to 98 mole % of a metal selected from the group consisting of chromium, copper, cobalt and nickel and 20 to 90 mole % aluminium; and $X^+$ is a cation selected from the group consisting of mono($C_{1-12}$alkyl)-ammonium, di($C_{1-12}$alkyl)ammonium, tri($C_{1-12}$alkyl)ammonium, 4-amino-2,2,6,6-tetramethylpiperidinyl, 4-hydroxy-2,2,6,6-tetramethylpiperidinyl and 4-keto-2,2,6,6-tetramethylpiperidinyl ions.

15. A mixed aluminium-heavy metal dyestuff complex of the formulae Ia, Ib and Ic

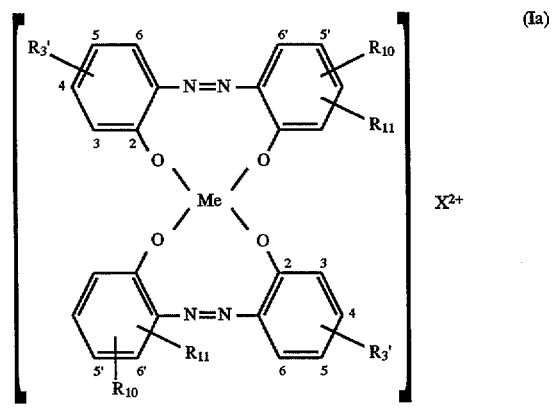

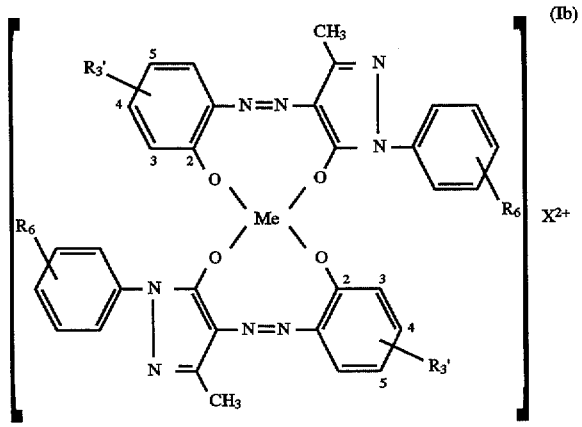

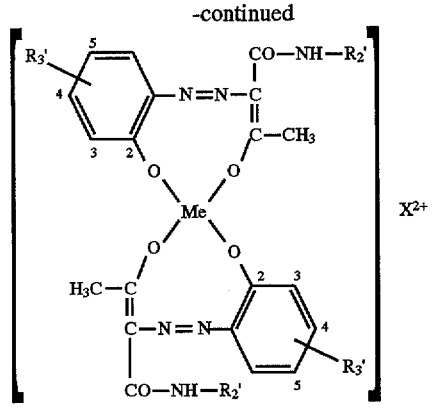

wherein each $R_3'$ is independently selected from the group consisting of nitro and —$SO_3NHR_7$; $R_7$ is selected from the group consisting of hydrogen, $C_{1-2}$alkyl, $C_{2-3}$alkoxy-$C_{2-3}$alkyl and phenyl; each $R_6$ is selected from the group consisting of hydrogen, halogen, $C_{1-2}$alkyl and $C_{1-2}$alkoxy;

each $R_2'$ is selected from the group consisting of 2-ethylhexyl and phenyl, unsubstituted or substituted by one to three substituents selected from chloro, bromo, and methyl or one or two substituents selected from chloro, bromo, methyl, ethyl, $C_{1-4}$alkoxy and acetyl; Me is 25 to 90 mole % chromium or cobalt and 5 to 75 mole % aluminium; $X^{2+}$ is selected from the group consisting of $C_{1-10}$alkylammonium, 4-amino-2,2,6,6-tetramethylpiperidinyl, 4-hydroxy-2,2,6,6-tetramethylpiperidinyl and 4-keto-2,2,6,6-tetramethylpiperidinyl ions; and each $R_{10}$ and each $R_{11}$ independently are selected from the group consisting of hydrogen, halogen, hydroxy, $C_{1-4}$alkyl, $C_{1-4}$alkoxy, acetyl, benzoyl, and 4,6-bis(2', 4'-dimethylphenyl)triazinyl-2, or collectively $R_{10}$ and $R_{11}$ together with the phenyl ring to which they are attached form a naphthyl group, preferably attached in the 5' and 6' position, said naphthyl group being substituted in the 4- or 5-position with $R_3'$.

16. A complex according to claim 14 wherein said Me comprises from 80 to 98 mole % of chromium and 2 to 20 mole % aluminium.

17. A complex according to claim 14 wherein said Me comprises from 25 to 98 mole % of cobalt and 2 to 75 mole % of aluminium.

18. A mixed aluminium-heavy metal dyestuff complex in which the heavy metal is present in an amount of 10 to 98 mole % and aluminium is present in an amount of 2 to 90 mole %, said mole % based on one mole of said aluminium-heavy metal dyestuff complex, the complex prepared by i) reacting a metal free dyestuff with less than a stoichiometric amount (calculated based on the metal free dyestuff or all the metal present in the complex) of a heavy metal compound to form a mixture, and ii) adding to said mixture an aluminium compound in an amount sufficient to produce a stoichiometric excess of metal (calculated based on all the metal present in the dyestuff complex) to form the mixed aluminium-heavy metal dyestuff complex.

19. A complex according to claim 18 in which the heavy metal compound is selected from the group consisting of a cobalt compound, copper compound, chromium compound and nickel compound.

20. A complex according to claim 18 wherein
a) the chromium compound is an alkali dichromate;
b) the cobalt compound is a cobalt chloride or a cobalt sulphate;
c) the nickel and copper compounds are selected from a nickel or copper halide, sulphate or acetate; and
d) the aluminium compound is aluminium sulphate.

21. A complex according to claim 18 in which the amount of heavy metal compound for a 1:1 dye:metal complex is 10 to 98 mole % per mole of metal-free dyestuff and for a 2:1 dye:metal complex is 10 to 98 mole % per two moles of metal-free dyestuff.

22. A complex according to claim 18 in which the amount of aluminium compound added to the mixture for a 1:1 dye:metal complex is 10 to 120 mole % per mole of metal-free dyestuff and for a 2:1 dye:metal complex is 10 to 120 mole % per two moles of metal-free dyestuff.

23. A complex according to claim 18 in which the metal-free dyestuff is selected from the group consisting of a water soluble dyestuff, a solvent soluble dyestuff and an insoluble dyestuff and pigment.

24. A complex according to claim 23 in which the metal-flee dyestuff is a solvent soluble, water insoluble dyestuff.

25. A complex according to claim 18 in which the complex is a 2:1 azo dye: mixed aluminium-heavy metal dyestuff complex.

26. A complex according to claim 18 in which the complex is one of formula I and I'

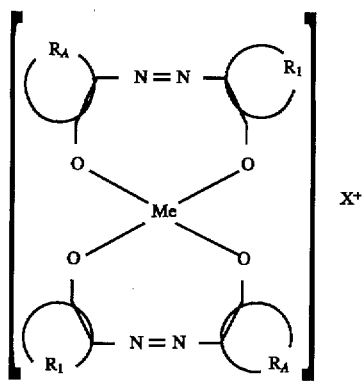

(I)

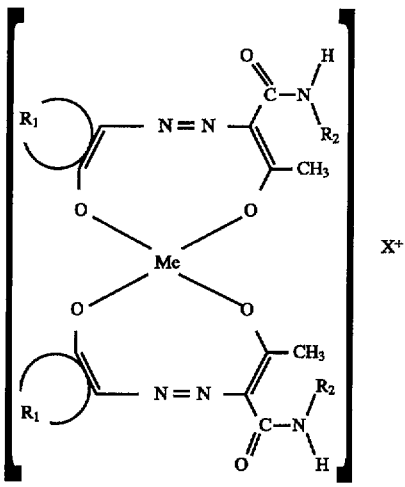

(I')

wherein each $R_1$ together with the two carbon atoms independently to which $R_1$ is attached form a single ring or fused ring aromatic group, which is unsubstituted or further substituted by one to three groups selected from the group consisting of hydroxy, $C_{1-4}$alkyl, $C_{1-4}$alkoxy, cyano, nitro, rhodan, $C_{1-4}$alkylcarbonyl, benzoyl, $C_{1-3}$alkylcarbonyloxy, aminocarbonyl, mono($C_{1-4}$alkyl)aminocarbonyl, di($C_{1-4}$alkyl)-aminocarbonyl, mono($C_{1-4}$alkoxy-$C_{2-4}$alkyl) aminocarbonyl, di($C_{1-4}$alkoxy-$C_{2-4}$alkyl)-aminocarbonyl, $C_{1-3}$alkoxycarbonyl, aminosulphonyl, mono($C_{1-4}$alkyl) aminosulphonyl, di($C_{1-4}$alkyl)aminosulphonyl, mono($C_{1-4}$ alkoxy-$C_{2-4}$alkyl)-aminosulphonyl, di($C_{1-4}$alkoxy-$C_{2-4}$ alkyl)aminosulphonyl, and 4,6-bis-(bis)(2',4'-dimethylphenyl)triazinyl-2; both groups $R_2$, independently are selected from the group consisting of $C_{3-20}$alkyl, $C_{1-4}$alkoxy-$C_{2-8}$alkyl and phenyl, which phenyl is unsubstituted or further substituted by one to three groups selected from the group consisting of hydroxy, $C_{1-4}$alkyl, $C_{1-4}$alkoxy, cyano, nitro, rhodan, $C_{1-4}$alkylcarbonyl, benzoyl, $C_{1-3}$alkylcarbonyloxy, aminocarbonyl, mono($C_{1-4}$alkyl) aminocarbonyl, di($C_{1-4}$alkyl)aminocarbonyl, mono- ($C_{1-4}$ alkoxy-$C_{2-4}$alkyl)aminosulphonyl, di($C_{1-4}$alkoxy-$C_{2-4}$alkyl) aminosulphonyl, $C_{1-3}$alkoxy-carbonyl, aminosulphonyl, mono($C_{1-4}$alkyl)-aminosulphonyl, di($C_{1-4}$alkyl)amino-sulphonyl, mono($C_{1-4}$alkoxy$C_{2-4}$alkyl)aminosulphonyl, and di($C_{1-4}$alkoxy-$C_{2-4}$alkyl)-aminosulphonyl; group $R_A$ together with the two carbon atoms independently to which $R_A$ is attached form a phenyl or naphthyl radical which is unsubstituted or further substituted by one or two groups independently selected from the group consisting of hydrogen, $C_{1-4}$alkyl. $C_{1-4}$alkoxy, cyano, nitro, $C_{1-4}$alkoxycarbonyl, benzoyl, phenoxycarbonyl, aminocarbonyl, mono($C_{1-4}$alkyl)aminocarbonyl, di($C_{1-4}$ alkyl)-aminocarbonyl, mono($C_{1-4}$alkoxy-$C_{2-4}$alkyl)-aminocarbonyl, di($C_{1-4}$alkoxy-$C_{1-4}$alkyl)-aminocarbonyl, phenylaminocarbonyl, aminosulphonyl, mono($C_{1-4}$alkyl) aminosulphonyl, di($C_{1-4}$alkyl)aminosulphonyl; mono($C_{1-4}$alkoxy-$C_{2-4}$alkyl)aminosulphonyl, di($C_{1-4}$alkoxy$C_{2-4}$alkyl) aminosulphonyl and phenylaminosulphonyl;

Me is 10 to 98 mole % of a metal selected from the group consisting of chromium, copper, cobalt and nickel and 20 to 90 mole % aluminium; and $X^+$ is a cation.

27. A complex according to claim 18 of the formula Ia, Ib and Ic

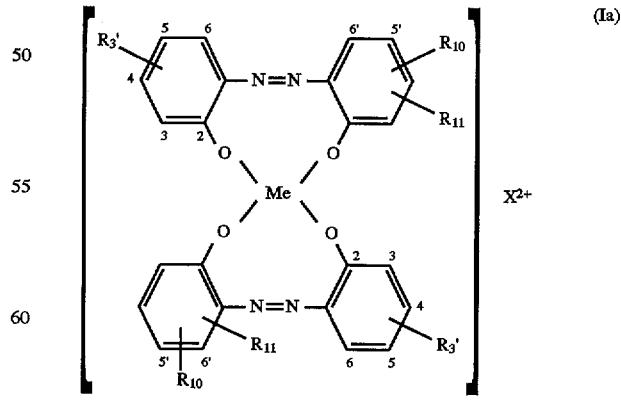

(Ia)

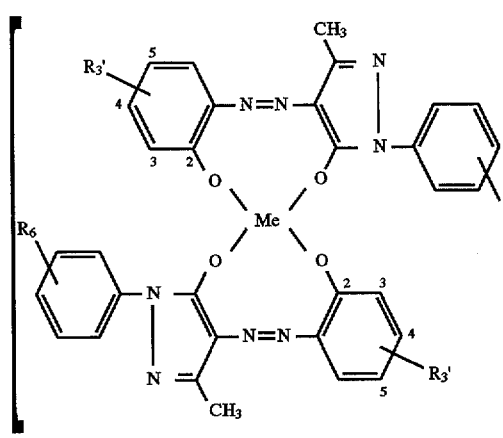
(Ib)

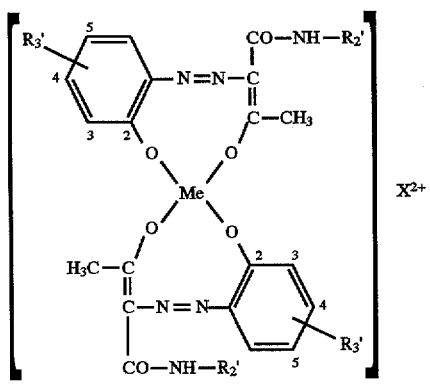
(Ic)

wherein each $R_3'$ is independently selected from the group consisting of nitro and —$SO_3NHR_7$;

$R_7$ is selected from the group consisting of hydrogen, $C_{1-2}$alkyl, $C_{1-2}$alkoxy-$C_{2-3}$alkyl and phenyl;

each $R_6$ is selected from the group consisting of hydrogen, halogen, $C_{1-2}$alkyl and $C_{1-2}$alkoxy;

each $R_2'$ is selected from the group consisting of 2-ethylhexyl and phenyl, unsubstituted or substituted by one to three substituents selected from chloro, bromo, and methyl or one or two substituents selected from chloro, bromo, methyl, ethyl, $C_{1-4}$alkoxy and acetyl;

Me is 25 to 90 mole % chromium or cobalt and 5 to 75 mole % aluminium;

$X^{2+}$ is selected from the group consisting of sodium, potassium, ammonium, $C_{1-10}$alkylammonium, 4-amino-2,2,6,6-tetramethylpiperidinyl, 4-hydroxy-2,2,6,6-tetramethylpiperidinyl and 4-keto-2,2,6,6-tetramethylpiperidinyl ions; and each $R_{10}$ and each $R_{11}$ independently are selected from the group consisting of hydrogen, halogen, hydroxy, $C_{1-4}$alkyl, $C_{1-4}$alkoxy, acetyl, benzoyl, and 4,6-bis(2',4'-dimethylphenyl) triazinyl-2, or collectively $R_{10}$ and $R_{11}$ together with the phenyl ring to which they are attached form a naphthyl group, preferably attached in the 5'- and 6'- position, said naphthyl group being substituted in the 4- or 5-position with $R_3'$.

28. A complex according to claim 15 comprising 25 to 98 mole % of chromium and 2 to 75 mole % of aluminium.

29. A complex according to claim 15 comprising 25 to 98 mole % of cobalt and 2 to 75 mole of aluminium.

\* \* \* \* \*